United States Patent
Font et al.

(10) Patent No.: US 6,845,696 B2
(45) Date of Patent: Jan. 25, 2005

(54) ASSEMBLY AND METHOD FOR CUTTING STRANDS FORMED BY THERMOPLASTIC FILAMENTS

(75) Inventors: Dominique Font, Saint-Baldolph (FR); Henri Prevosto, Aix les Bains (FR); Laurent Berthelon, Saint-Baldolph (FR)

(73) Assignee: Saint-Gobain Vetrotex France S.A., Chambery (FR)

( * ) Notice: Subject to any disclaimer, the term of this patent is extended or adjusted under 35 U.S.C. 154(b) by 0 days.

(21) Appl. No.: 10/312,849

(22) PCT Filed: Jun. 28, 2001

(86) PCT No.: PCT/FR01/02053
§ 371 (c)(1), (2), (4) Date: Jul. 10, 2003

(87) PCT Pub. No.: WO02/02854
PCT Pub. Date: Jan. 10, 2002

(65) Prior Publication Data
US 2004/0025656 A1 Feb. 12, 2004

(30) Foreign Application Priority Data
Jul. 5, 2000 (FR) .......................................... 00 08727

(51) Int. Cl.⁷ .............................................. B26D 5/08
(52) U.S. Cl. ............................... 83/36; 83/469; 83/601; 83/913
(58) Field of Search ................................ 83/13, 35, 36, 83/469, 907, 909, 913, 601

(56) References Cited

U.S. PATENT DOCUMENTS

| | | | |
|---|---|---|---|
| 4,367,084 A | * | 1/1983 | Cox et al. .................... 65/536 |
| 4,369,681 A | * | 1/1983 | Van Doorn et al. ........... 83/100 |
| 4,548,106 A | * | 10/1985 | Fleissner ........................ 83/18 |
| 4,682,523 A | * | 7/1987 | Johnson et al. ................. 83/19 |
| 4,771,665 A | * | 9/1988 | Van Doorn et al. .......... 83/62.1 |
| 5,092,207 A | * | 3/1992 | Kikuchi et al. ................ 83/116 |
| 5,108,678 A | * | 4/1992 | Hirasaka et al. ............. 264/113 |
| 5,398,575 A | * | 3/1995 | Rewitzer ........................ 83/72 |
| 5,970,837 A | * | 10/1999 | Arterburn et al. ............. 83/552 |
| 6,182,332 B1 | * | 2/2001 | Jander ............................ 19/60 |
| 6,202,525 B1 | * | 3/2001 | Hendrickson et al. ......... 83/16 |
| 6,267,035 B1 | * | 7/2001 | Bascom et al. ............... 83/346 |
| 6,415,997 B1 | * | 7/2002 | Font et al. ..................... 241/30 |

FOREIGN PATENT DOCUMENTS

| | | |
|---|---|---|
| CH | 284 044 | 7/1952 |
| EP | 0 849 381 | 6/1998 |
| EP | 0 978 580 | 2/2000 |
| FR | 2 126 663 | 10/1972 |
| GB | 2 036 716 | 7/1980 |
| JP | 58 190834 | 11/1983 |

* cited by examiner

Primary Examiner—Charles Goodman
(74) Attorney, Agent, or Firm—Oblon, Spivak, McClelland, Maier & Neustadt, P.C.

(57) ABSTRACT

An assembly and associated method for cutting strands formed by thermoplastic filaments. The assembly includes a blade-holder wheel and an anvil-wheel rotating in reverse directions about two parallel axes, and at least a mechanism for actuating the wheels and for contacting a strand with the anvil wheel. The assembly further includes a mechanism oscillating the support of the wheels, whereof the axis of the support is parallel to the axis of the wheels, and an associated actuator. A mechanism for contacting the wheels is designed in particular to pinch the strand and the associated actuator for passing the strand between the blade-holder wheel and the anvil-wheel when the wheels are not in contact.

13 Claims, 5 Drawing Sheets

ASSEMBLY AND METHOD FOR CUTTING STRANDS FORMED BY THERMOPLASTIC FILAMENTS

This Application is a 371 of PCT/FR01/02053 filed on Jun. 28, 2001 which claims benefit to french Application No. 00/08727 filed on Jul. 5, 2000.

BACKGROUND OF THE INVENTION (1) Field of the Invention

The present invention relates to the manufacture of strands formed of cut thermoplastic filaments, particularly glass filaments and more particularly still to a cutting method and assembly intended for such manufacture.

(2) Description of Related Art

As is known, the cutting of strands (sometimes known as threads) is obtained by passing the filamentary material between a wheel known as an anvil and a wheel known as a cutting wheel which is equipped with blades protruding uniformly at its periphery, the two wheels rotating in opposite directions to each other. The anvil wheel, generally made of elastomer of the polyurethane type, is arranged so that it comes into contact under pressure with the edge of the blades protruding from the cutting wheel, thus defining a cutting region.

To keep such installations at an optimum level of profitability, it is, of course, necessary for cutting to be performed continuously, with the fewest possible stoppages. Stoppages are essentially brought about by the breakage of the supply thread. After each breakage, the cutting device needs to be "restarted", that is to say that the thread has to be placed back in the cutting region, with greater or lesser success.

There are several known solutions: Document FR 2 162 068 describes a cutting machine the press cylinder of which is extended by a frustoconical part. The machine is enclosed in a protective casing provided with an opening through which the frustoconical part of the press cylinder protrudes, the front face of which is itself hidden by a protective plate fixed to said casing. Between the plate and the casing there is thus a lateral opening through which the strand made up of glass filaments is brought by hand into contact with the frustoconical part of the press cylinder. The strand becomes wound onto and rises up along the conical surface before being taken between the cutter and the anvil.

The operation of such a device entails, on each restart, bringing the rate of travel of the strand back up to a value of about 1 to 2 m/sec: this is acceptable when the device is supplied with a strand from a single die, but is not so in the case of the simultaneous cutting of several strands from several dies. What happens is that any accidental breakage of one of the strands leads to stoppage of the forming operation on all the dies, and this disrupts their operation, accelerates wear of the hardware and appreciably reduces the productivity of the installation.

An alternative form of the previous device is described in French publication FR 2 204 715. According to the latter, the cutting machine comprises a press cylinder extended by a cone frustum ending in a small-diameter vertex. A start-up roll, consisting of a series of disks, presses on a generatrix of the cone frustum. The cutter/anvil assembly rotates constantly at its normal speed.

During a restart operation, the strand, passing first of all through a guide wheel aligned with the cutting region, is brought up close to the vertex of the cone frustum onto which it winds therefore at a low speed. Because the strand tends to follow a straight path, it soon becomes jammed between the start-up roll and the surface of the cone frustum, rises gradually up along the latter, experiencing an increasing drawing speed before finally being taken between the anvil and the cutter.

This arrangement therefore allows a strand to be introduced without altering the rotational speed of the cutting machine. However, this device is not without drawbacks.

Indeed, to avoid premature breaking of the strand, it is necessary for its drawing speed to increase gradually and this entails fitting to the anvil a cone frustum which is very long and therefore naturally mounted with overhang. This situation is exacerbated by the pressure exerted on the cone frustum by the series of disks that form the start-up roll. A device such as this wears very quickly particularly when drawing rates of between 30 and 50 m/sec are to be maintained.

Another type of device, described in document FR 2 397 370 also anticipates introducing the strand laterally into the cutting apparatus.

This device comprises an auxiliary press cylinder arranged next to one of the ends of the main press cylinder and aligned axially with the latter, and an auxiliary blade-holder cylinder arranged to collaborate with the auxiliary press cylinder.

Upon accidental breakage of a strand, the latter may be reintroduced into the cutting machine, without stopping the latter, as follows:

After manual drawing, the strand is introduced between the auxiliary cylinders at low speed, and held in this position by a grooved pulley.

The speed of the two auxiliary cylinders, which act like a cutting machine, is gradually increased until the strand reaches its normal drawing speed. By moving the grooved pulley, the strand is then brought into the main cutting region.

This device constitutes an interesting solution to the difficulties associated with introducing a thread-like strand into a cutting machine rotating at high speed. However, each time it is necessary to change the main cutting machine, the auxiliary cylinders have to be removed and refitted, and this is not without its disadvantages in continuous manufacture which demands a minimum of down time.

One solution to this problem is described in document FR 2 490 251 which essentially consists in drawing the strand in a region lying between the planes passing between the flanks of the blade-holder cylinder collaborating with an anvil cylinder, the axes of rotation of said cylinders passing through a roughly horizontal plane, then in deflecting the strand thus drawn toward the cutting region defined by the region of contact between the anvil cylinder and the blade-holder cylinder, to press it onto at least a portion of the surface of the cylinder arranged upstream, said surface portion being more or less adjacent to the cutting region.

However, this solution entails at least one human intervention for performing the initial drawing of the strand in a horizontal plane as far as the start-up region. It is at this stage that there are a great many breakages and therefore a great amount of time lost. This is especially true since several strands from several dies are generally brought by the operator to the starter together.

Thus, it has been possible to measure a breakage rate of the order of 20 breakages per die per day.

Another solution consists in conceiving of a cutting system such as described in U.S. Pat. No. 5,935,289 in which the strand is gripped under each die and brought automatically toward a restart system.

However, this system is sophisticated. In particular, it comprises a fairly complex restart assembly, guidance, protection and controls for the gripper which are all just as complex.

The present invention proposes an assembly which comprises neither a restart wheel nor a small guide roller and which simply by moving the strand in a straight line allows restarting to be performed automatically and which therefore proves far simpler to operate than the previous systems, making it possible to obtain a restart success rate of close to 100%, and in any event higher than 98%.

Furthermore, by comparison with a cutting assembly as described for example in Patent FR 2 490 251, the present invention is completely automated because it involves no human intervention on the strand.

Furthermore, the present invention has neither an arm for engaging the strand in the cutting region nor a restart wheel. These elements are essential to the operation of the prior art, but give rise to a not insignificant restart failure rate because of the forces applied to the strand as they are set in operation.

This is a major disadvantage of the prior art that the present invention is able to overcome.

BRIEF SUMMARY OF THE INVENTION

In effect, the object of the present invention is to provide a cutting assembly which can be restarted (that is to say in which the strand can be picked up and cutting begun) without human intervention.

Furthermore, the present invention is aimed at a simple solution, involving a low number of elements, so as to have better reliability and therefore better efficiency.

Thus, the subject of the present invention is an assembly for cutting strands formed of thermoplastic filaments and comprising a blade-holder wheel and an anvil-wheel rotating in opposite directions about two parallel axes, at least one means of actuating said wheels and a means of bringing the strand into contact with the anvil-wheel.

According to the invention, the cutting assembly further comprises
- an oscillating means of supporting said wheels the axis of which is parallel to the axis of said wheels and an associated actuating means;
- a means for placing said wheels in contact;
- a means intended in particular to grip the strand and an associated actuating means intended to pass the strand between the blade-holder wheel and the anvil-wheel when said wheels are not in contact.

According to one of its aspects, the cutting assembly further comprises a means intended to vary the position of the strand on the anvil-wheel so as to ensure that the contact moves back and forth across the width of said wheel.

This advantageously allows the wear on the anvil-wheel to be distributed across its entire width.

More precisely, the variation means comprises at least one roller actuated by a set of link rods and is associated with a cam.

In a particular way, the cutting assembly according to the invention may further comprise a means of limiting the rotation of the oscillating support between two extreme positions.

Without departing from the scope of the invention, the cutting assembly further comprises a means of machining the peripheral surface of the anvil-wheel.

Furthermore, the cutting assembly comprises a separating small wheel arranged upstream of the cutter and of the means for placing the strand in contact with the anvil-wheel.

The invention is also aimed at a method for cutting thermoplastic threads consisting in arranging at least one strand around an anvil-wheel with a certain wrap arc then in cutting the strand by contact of said anvil-wheel with a blade-holder wheel rotating in the opposite direction to the anvil-wheel, said wheels having two parallel axes.

According to the invention, the cutting method further consists in automatically restarting cutting by virtue of a particular and simultaneous rotation of the axis of said wheels which is associated with the rotation of said wheels about their respective axes ($x_1$, $x_2$).

More specifically, the restart consists in gripping the strand upstream of the wheels, in passing it between said wheels in the stationary and parted from one another state in a straight path, in moving the wheels closer together, in initiating the rotation of the wheels, in orienting them in such a way as to have an optimum wrap arc of the strand over the anvil-wheel prior to cutting and a given direction of projection of the cut threads.

According to one of its aspects, the cutting method further consists in varying the position of the strand across the width of said anvil-wheel.

Thus, the cutting method may involve moving the strand back and forth across the width of the anvil-wheel.

Furthermore, the cutting method may consist in machining of the anvil-wheel outside the cutting periods.

Furthermore, the method consists in cutting the strand after it has been gripped.

According to the invention, the method may further consist in bringing the uncut part of the strand out of the region into which the cut threads fall during the return movement of the gripper toward its original position.

BRIEF DESCRIPTION OF THE DRAWINGS

Further characteristics, advantages and details of the invention will become better apparent on reading the description which will follow, given by way of nonlimiting illustration with reference to the appended drawings in which.

DETAILED DESCRIPTION OF THE INVENTION

In a known way, the cutter comprises a blade-holder wheel 1 equipped with cutting blades protruding along its radii. The cutting blades are not depicted in the figures. The cutter also comprises a wheel known as an "anvil" 2 the axis ($x_2$) of which is parallel to that ($x_1$) of the blade-holder wheel 1; when these two wheels are brought closer together, touch along their generatrices and rotate in opposite directions from one another, a cutting region is thus created.

Of course, the respective tangential velocities of the wheels 1, 2 have to be equal and the gripping torque between the wheels 1 and 2 can be adjusted to suit various cutting parameters such as the diameter of the filaments of which the strand is made, the nature of the strand, the cutting rate, etc.

Furthermore, a wheel known as a machining wheel 4 may be provided near the anvil-wheel 2 so as to grind the exterior surface of this wheel when necessary and/or possible.

According to the invention, the blade-holder wheel 1 and the anvil-wheel 2 are mounted on a rotary means such as a barrel 3 which can oscillate about an axis $X_3$ parallel to the axes $x_1$ and $x_2$ of each of the wheels 1 and 2.

Figure 1:
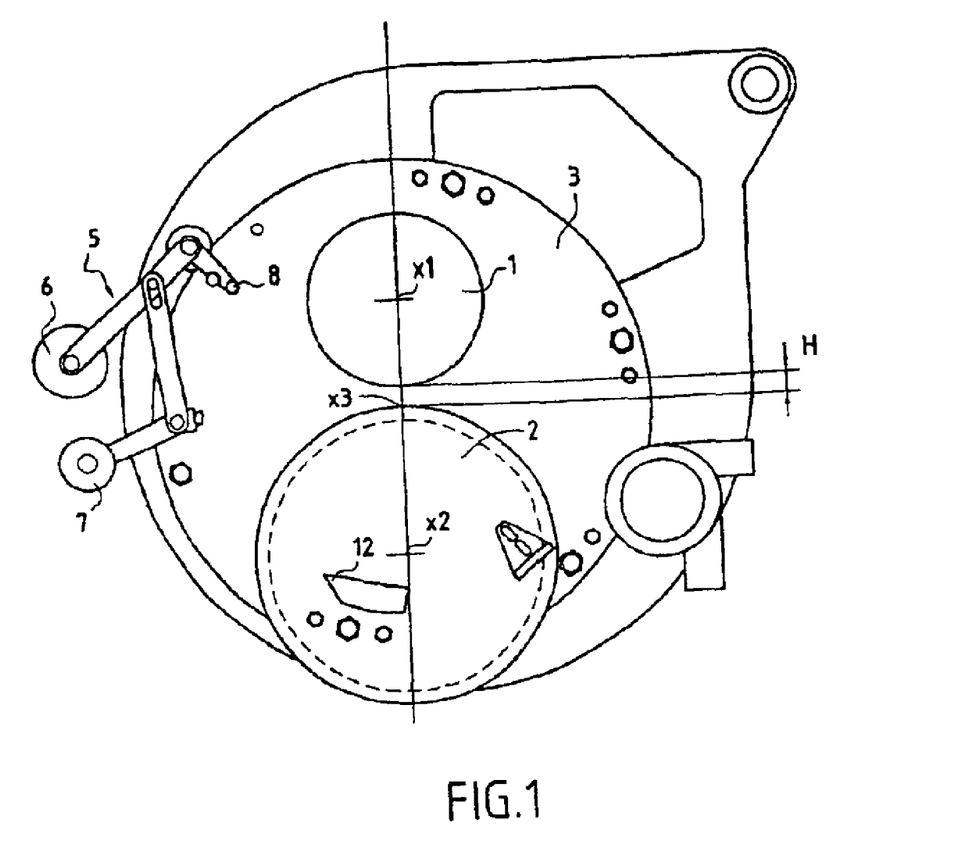
FIG. 1 is a schematic view of a cutting assembly according to the invention in the stopped position.

In FIG 1, which relates to a position of non-operation, the wheels 1 and 2 are a distance H apart which can, incidentally, vary over time, depending on the degree of wear to the anvil-wheel 2.

The cutting assembly according to the invention further comprises a collection of link rods 5 intended to move into position several elements:

- an inlet small wheel 6 intended to guide the strand upstream of the anvil-wheel 2, as will be explained in greater detail hereinbelow;
- a separating small wheel 7 intended possibly to keep the various filaments of which the strand is formed separate. This element is not, however, essential to the operation of the invention;
- a control roller 8 the function of which will be specified later on.

Figure 2:
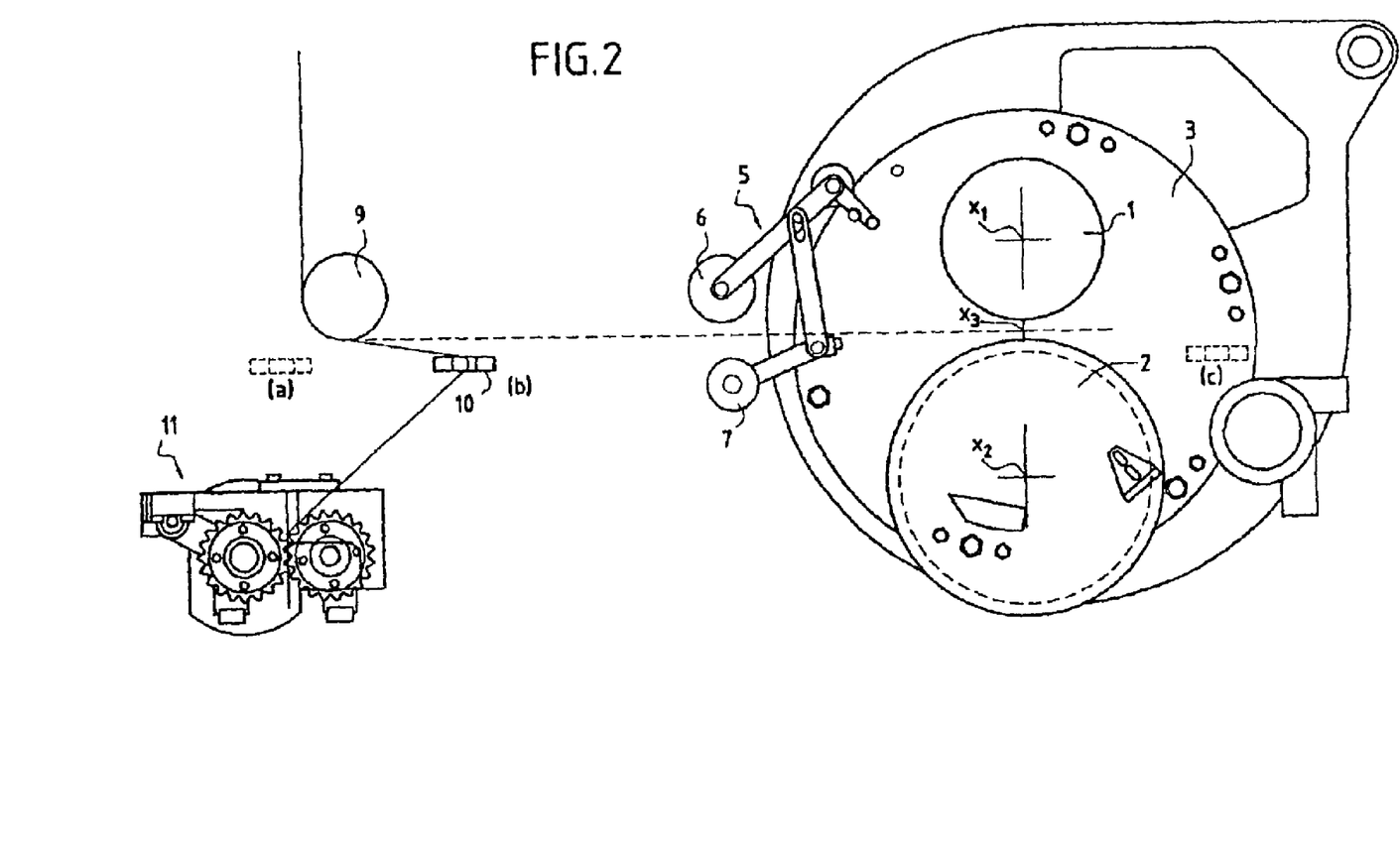
FIG. 2 is an overall diagram of the invention.

FIG. 2 shows not only the cutter itself (as in FIG. 1) but also a small wheel 9 known as a deflection wheel intended, in operation, to deflect the strand originating from a die from the vertical direction to the horizontal direction. The latter orientation being the orientation in which the strand arrives at the cutter.

FIG. 2 also shows a gripper 10 shown schematically in three different positions (a) (b) and (c): (a) is an end position in which the gripper grips at least one strand, (b) is an intermediate position in which the strand is gripped and driven by the gripper, while (c) is another end position in which the strand is released by the gripper. This operation will be explained in greater detail hereinafter. Advantageously, the path of the gripper is a straight line.

Figure 3:
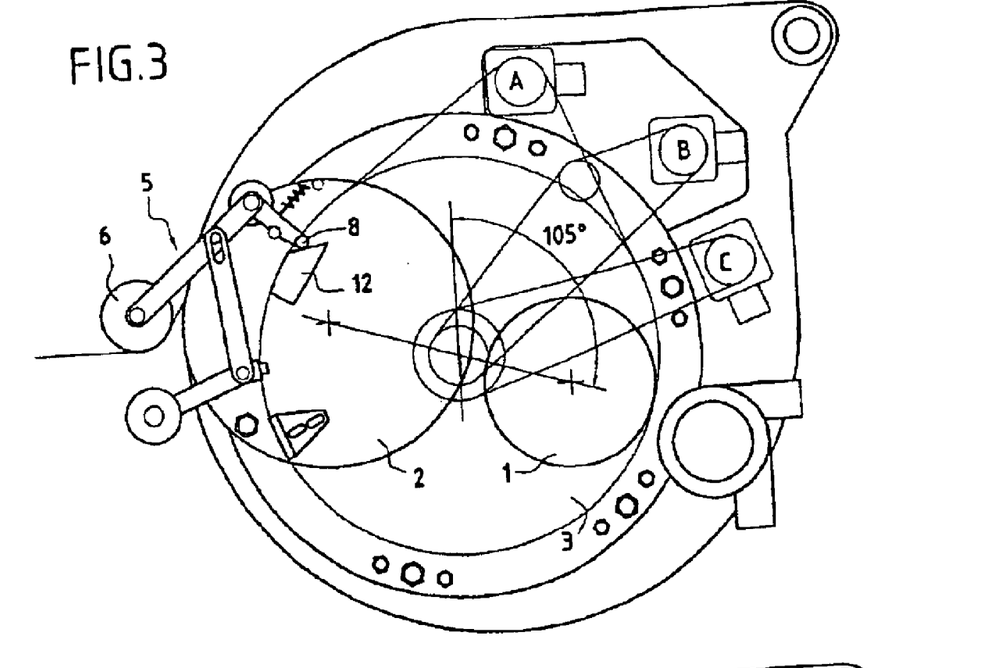
FIG. 3 is a schematic view showing essential elements of the invention just before the gripping of the strand.

FIG. 3 illustrates a second position, which follows on from that of FIG. 1, in which the barrel 3 has rotated in the contrarotary direction by a first angle $\alpha_1 \cong 105°$ under the action of a first motor A. A cam 12 secured to the barrel and arranged on its periphery then comes into contact with the roller 8 and this has the effect of moving the small wheel 6 closer to the anvil-wheel 2 which now lies in the region of the link rods 5.

At the end of this sequence, that is to say when the barrel 3 has rotated through an angle $\alpha_2 > \alpha_1$, a second motor C actuates the clamping of the wheels 1 and 2 one against the other while a third motor B drives the cutting wheel 1.

Between the positions of FIGS. 2 and 3, that is to say before the wheels are clamped together, the gripper 9 has slipped the strand between the wheels 1 and 2 while they are still parted, then released the strand once the wheels 1, 2 have been clamped one against the other and are rotating at a speed compatible with the output rate of the die.

Figure 4:
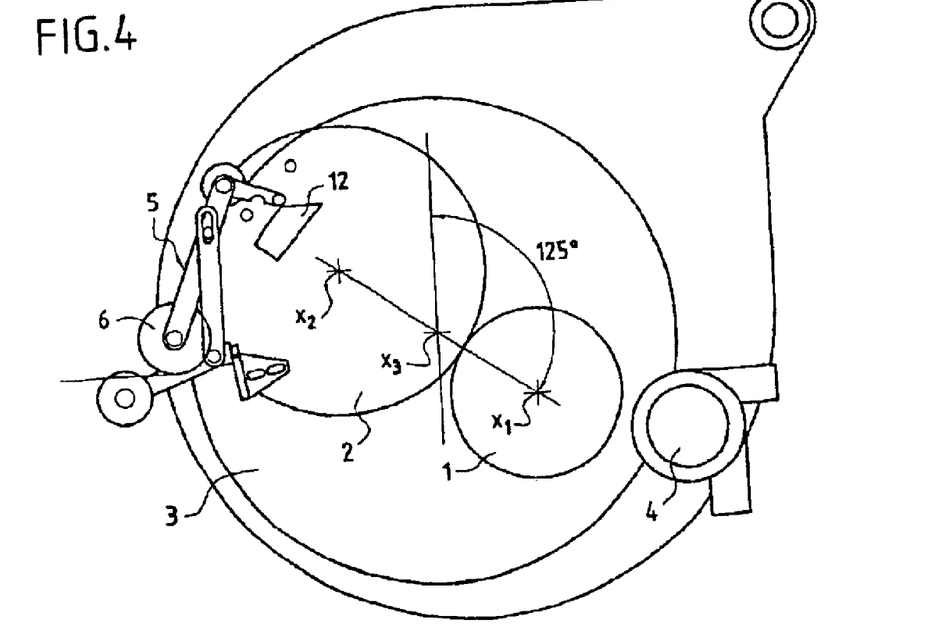
FIG. 4 is a schematic view of the invention during the gripping of the strand.

FIG. 4 illustrates this position with, by way of illustration, an angle $\alpha_2 \cong 125°$. The inlet small wheel 6 is then as close as possible to the anvil-wheel 2.

Figure 5:
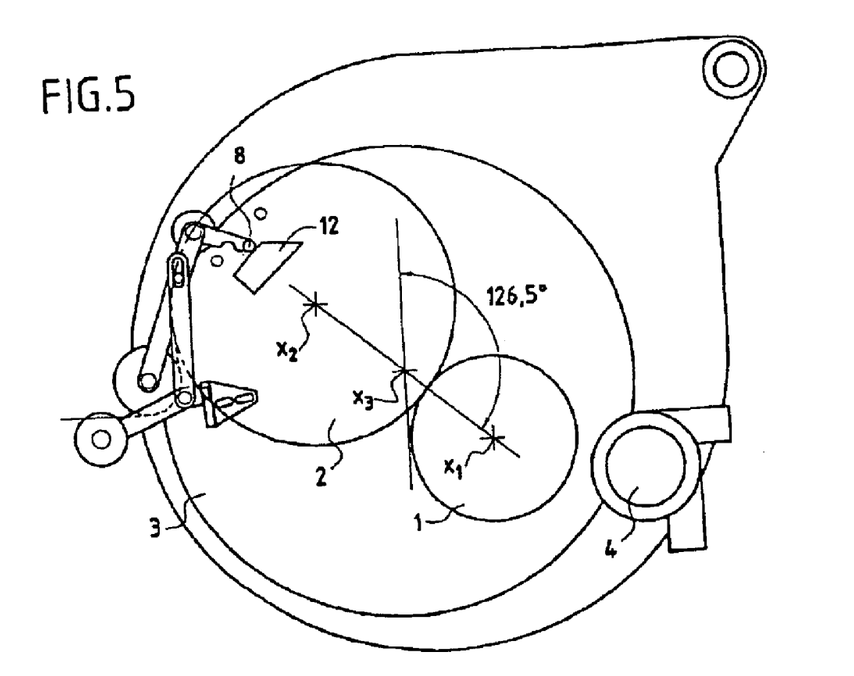
FIGS. 5 and 6 are schematic views of the cutter according to the invention, in two cutting positions.

FIG. 5 shows a position of the barrel 3 which is slightly further offset than that of FIG. 4, which corresponds to the initiation of an oscillating rotary movement of the barrel. This movement is initiated by the position of the roller 8 on a cam 12 and generates a back and forth movement of the strand across the width of the anvil-wheel 2. This advantageously allows the wear on said wheel 2 to be distributed uniformly and therefore allows its effects to be reduced.

At this stage in the process, the angle of wrap of the strand around the anvil-wheel 2 is of the order of 250°.

Figure 6:
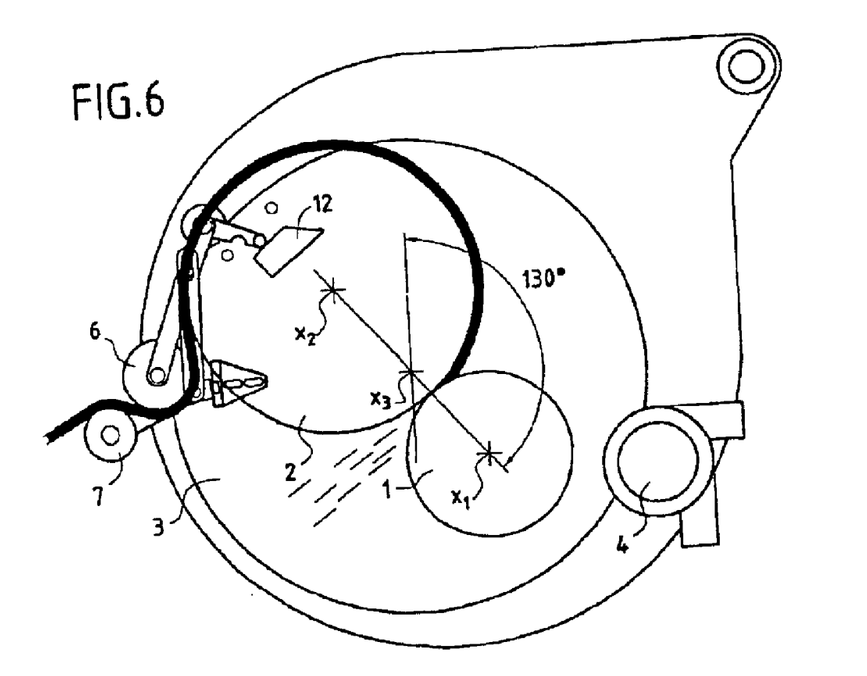

FIG. 6 shows a dark line around the wheel 2, and this corresponds to this wrapping of the strand. Incidentally, this line shows that the strand passes, in succession, upstream of the wheel 2, over the separating small wheel 7 and under the inlet small wheel 6.

By comparison with FIG 5, the barrel 3 has rotated through a few additional degrees, as far as one end position of the back and forth movement, which means that it now begins to oscillate in the opposite direction (counterclockwise direction) through a given angle as far as the second end position of the back and forth movement. By way of illustration, the barrel can oscillate by about 50° in its oscillating movement about the axis $x_3$.

Incidentally, it is possible, without departing from the scope of the invention, to machine the exterior surface of the anvil-wheel 2. This is performed, for example, during a breakage or during a planned shutdown.

Figure 7:
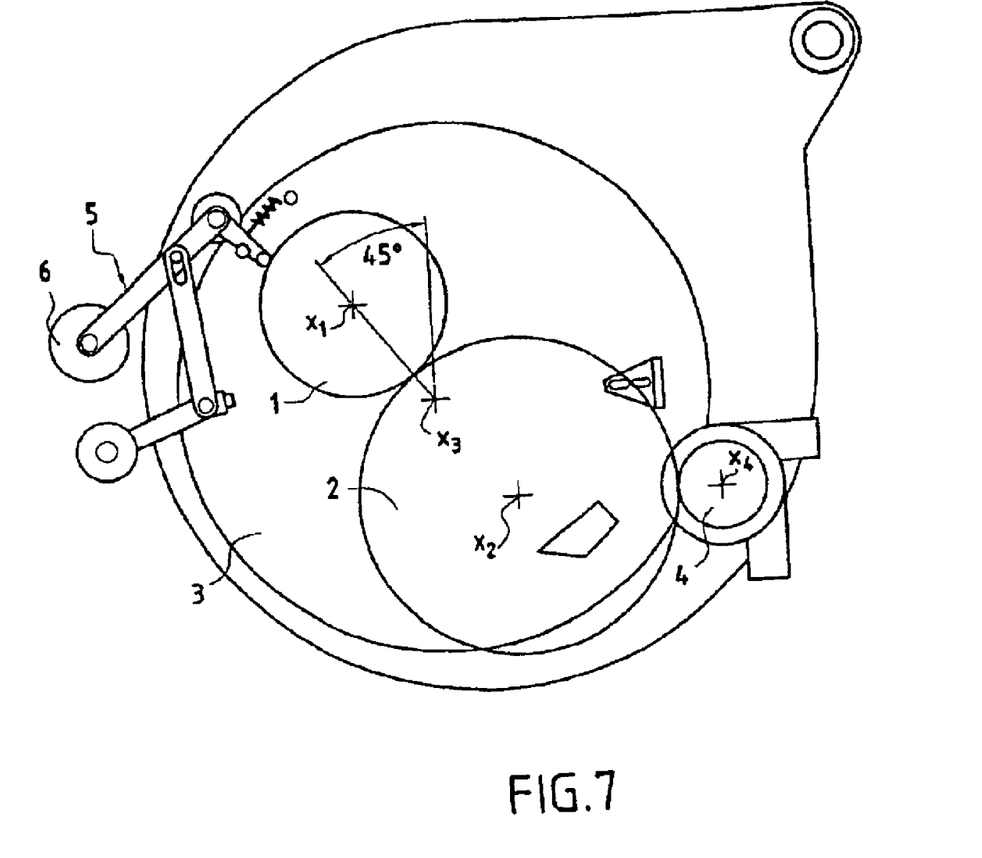
FIG. 7 is a schematic view of the cutter during the machining of the anvil-wheel.

FIG. 7 illustrates the position of the barrel 3 for this operation.

A grinding wheel 4 is arranged more or less diametrically opposite the link rods 5, although this particular arrangement is not compulsory. This arrangement is chosen here essentially for space reasons.

The anvil-wheel 2 to be machined is brought through an appropriate rotation of the barrel 3 up close to the grinding wheel 4, so that the two wheels (2 and 4) meet tangentially. As a preference, one and the same motor, in this instance the motor B of the wheel 1, actuates the two wheels and causes them to turn in opposite directions. For this operation (FIG. 7), the barrel 3 has rotated through about 450° in the counterclockwise direction with respect to the position of non-operation.

Broadly speaking, the way in which the cutting assembly according to the invention works is as follows:

Prior to the beginning of a restart, the assembly is in the position illustrated in FIG. 2, except for the strand which is gripped in the puller 11, that is to say tensioned vertically. The gripper 10 is in position (a).

A motor (not depicted) actuates the gripper 10 which, when it touches the strand, closes onto it. The speed of the gripper needs to be tailored to the speed of the puller so as not to create any jerking in the strand.

An independent means then allows the part of the thread between the gripper 10 and the puller 11 to be cut.

The gripper 10 continues its linear path, indicated in dotted line in FIG. 2, pulling the strand with it. It passes in particular between the two wheels 1 and 2 which are stationary, parted from one another.

Once it reaches position (c), the gripper 10 stops. Prior to this moment, the wheels 1 and 2 have been clamped one against the other and set in rotation: position according to FIG 4. In consequence, the strand is gripped by the wheels, with a clamping force which is somewhat weak to start with, then increases, signifying the start of actual cutting.

Furthermore, the gripper 10, having stopped at position (c) returns to position (a) in a straight path parallel to the outbound path but offset so as to pass beside the wheels which are now in operation. During this return path toward the initial position (a), the gripper grips the uncut part of the strand and brings it out of the region into which the cut threads fall.

From there, an oscillating movement of the barrel 3 is created which movement is connected to a back and forth movement of the strand across the width of the anvil-wheel 2.

Actual cutting is thus performed until either there is a breakage or there is a planned shutdown, for example to change the anvil-wheel 2 or to machine it.

What is claimed is:

1. An assembly for cutting strands formed of thermoplastic filaments, comprising:
   a blade-holder wheel and an anvil-wheel rotating in opposite directions about two parallel axes;
   at least one means for actuating said wheels and means for bringing a strand into contact with the anvil-wheel;
   oscillating means for supporting said wheels, an axis of said oscillating means being parallel to an axis of said wheels and an associated actuating means;
   means for placing said wheels in contact;
   means for gripping said strand and an associated actuating means for passing the strand between the blade-holder wheel and the anvil-wheel when said wheels are not in contact.

2. The cutting assembly as claimed in claim 1, further comprising variation means for varying a position of the strand on the anvil-wheel to ensure that contact moves back and forth across a width of said anvil-wheel.

3. The cutting assembly as claimed in claim 2, wherein the variation means comprises at least one roller actuated by a set of link rods and associated with a cam.

4. The cutting assembly as claimed in claim 2, further comprising means for limiting rotation of the oscillating means between two extreme positions.

5. The cutting assembly as claimed in claim 1, further comprising means for machining a peripheral surface of the anvil-wheel.

6. The cutting assembly as claimed in claim 1, further comprising a separating small wheel arranged upstream of a cutter and of the means for bringing the strand in contact with the anvil-wheel.

7. A method for cutting strands formed of thermoplastic filaments comprising:
   arranging a thread around an anvil-wheel with a certain wrap arc;
   cutting the strand by contact of the anvil-wheel with a blade-holder wheel rotating in an opposite direction to the anvil-wheel, said wheels having two parallel axes;
   automatically restarting cutting by virtue of a particular and simultaneous rotation of the axis of said wheels, which is associated with rotation of said wheels about their respective axes.

8. The method as claimed in claim 7, wherein the automatically restarting includes:
   gripping the strand upstream of said wheels;
   passing the strand between said wheels in a stationary and parted from one another state in a straight path;
   moving said wheels closer together;
   initiating the rotation of said wheels;
   orienting said wheels to have an optimum wrap arc of the strand over the anvil-wheel prior to cutting and a given direction of projection of the cut threads.

9. The method as claimed in claim 8, further comprising varying a position of the strand across a width of the anvil-wheel.

10. The method as claimed in claim 9, further comprising giving the strand back and forth movement across a width of the anvil-wheel.

11. The method as claimed in claim 7, further comprising machining the anvil-wheel outside periods of cutting.

12. The method as claimed in claim 8, further comprising cutting the strand after it has been gripped.

13. The method as claimed in claim 12, further comprising returning an uncut strand portion, while the gripper is returning to its original position, out of a region into which the cut threads fall.

* * * * *

UNITED STATES PATENT AND TRADEMARK OFFICE
CERTIFICATE OF CORRECTION

PATENT NO. : 6,845,696 B2
DATED : January 25, 2005
INVENTOR(S) : Dominique Font et al.

It is certified that error appears in the above-identified patent and that said Letters Patent is hereby corrected as shown below:

Column 6,
Line 17, change "50°" to -- 5° --.
Line 35, change "450°" to -- 45° --.

Signed and Sealed this

Fourteenth Day of June, 2005

JON W. DUDAS
*Director of the United States Patent and Trademark Office*